United States Patent
Ramamurthy

(10) Patent No.: US 8,335,486 B1
(45) Date of Patent: Dec. 18, 2012

(54) AVERAGE CONCURRENT USE INDICATOR FOR POSITIONING DETERMINING EQUIPMENT

(75) Inventor: Suryanarayanan Ramamurthy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 425 days.

(21) Appl. No.: 12/607,105

(22) Filed: Oct. 28, 2009

(51) Int. Cl.
*H04M 11/00* (2006.01)
*H04W 24/00* (2009.01)

(52) U.S. Cl. ............... 455/405; 455/406; 455/456.1

(58) Field of Classification Search ......... 455/404.2, 455/456.1, 456.3, 456.5, 456.6, 451, 452.1, 455/452.2, 453, 405, 406, 408, 423, 424, 455/456.2; 705/52, 7.11, 7.38, 7.39; 701/408, 701/483; 714/47.1, 47.2
See application file for complete search history.

(56) References Cited

U.S. PATENT DOCUMENTS

| 7,225,103 | B2* | 5/2007 | Beresniewicz et al. ....... 702/179 |
| 7,948,909 | B2* | 5/2011 | Bugenhagen et al. ........ 370/252 |
| 8,023,958 | B2* | 9/2011 | Wang et al. ................ 455/456.1 |
| 2007/0270163 | A1 | 11/2007 | Anupam et al. |

* cited by examiner

*Primary Examiner* — George Eng
*Assistant Examiner* — Hung Du

(57) ABSTRACT

In a communication system, Position Determining Equipment (PDE) receives location queries from wireless communication devices, determines geographic location data for the wireless communication devices using a plurality of different position fix types, and transfers the geographic location data to the wireless communication devices. The PDE also determines location session data indicating cumulative session time for each of the different position fix types. A PDE data processing system adds the cumulative session time for each of the different position fix types to determine total session time for all of the position fix types. The PDE data processing system divides the total session time for all of the position fix types by the total time to determine an indicator of average concurrent use of the PDE.

20 Claims, 7 Drawing Sheets

US 8,335,486 B1

AVERAGE CONCURRENT USE INDICATOR FOR POSITIONING DETERMINING EQUIPMENT

TECHNICAL BACKGROUND

Wireless communication devices obtain location-based services from various service providers over a communication network. A few examples of these numerous location-based services include driving directions, maps, and recommendations for nearby restaurants. The geographic location of the wireless communication device is required to provide the location-based service.

Various techniques are used to determine the geographic location of a wireless communication device. One technique is the use of Global Position Satellite (GPS) coordinates that are provided by the wireless communication device. Another technique is base-station triangulation this is performed by the wireless network. Yet another technique uses the base station sector occupied by the wireless communication device to estimate a rough position. There are also hybrid techniques that combine aspects of the above-described location determination techniques.

Position Determining Equipment (PDE) uses these different techniques to determine the geographic locations of multiple wireless communication devices. At any given moment in time, the PDE is typically interacting with numerous wireless communication devices and using the various techniques to determine and provide device locations. The PDE tracks the cumulative amount of time spent using each technique to determine and provide the device locations. The PDE does not determine the average number of concurrent users.

Overview

In a communication system, Position Determining Equipment (PDE) receives location queries from wireless communication devices, determines geographic location data for the wireless communication devices using a plurality of different position fix types, and transfers the geographic location data to the wireless communication devices. The PDE also determines location session data indicating cumulative session time for each of the different position fix types. A PDE data processing system adds the cumulative session time for each of the different position fix types to determine total session time for all of the position fix types. The PDE data processing system divides the total session time for all of the position fix types by the total time to determine an indicator of average concurrent use of the PDE.

DETAILED DESCRIPTION

Figure 1:
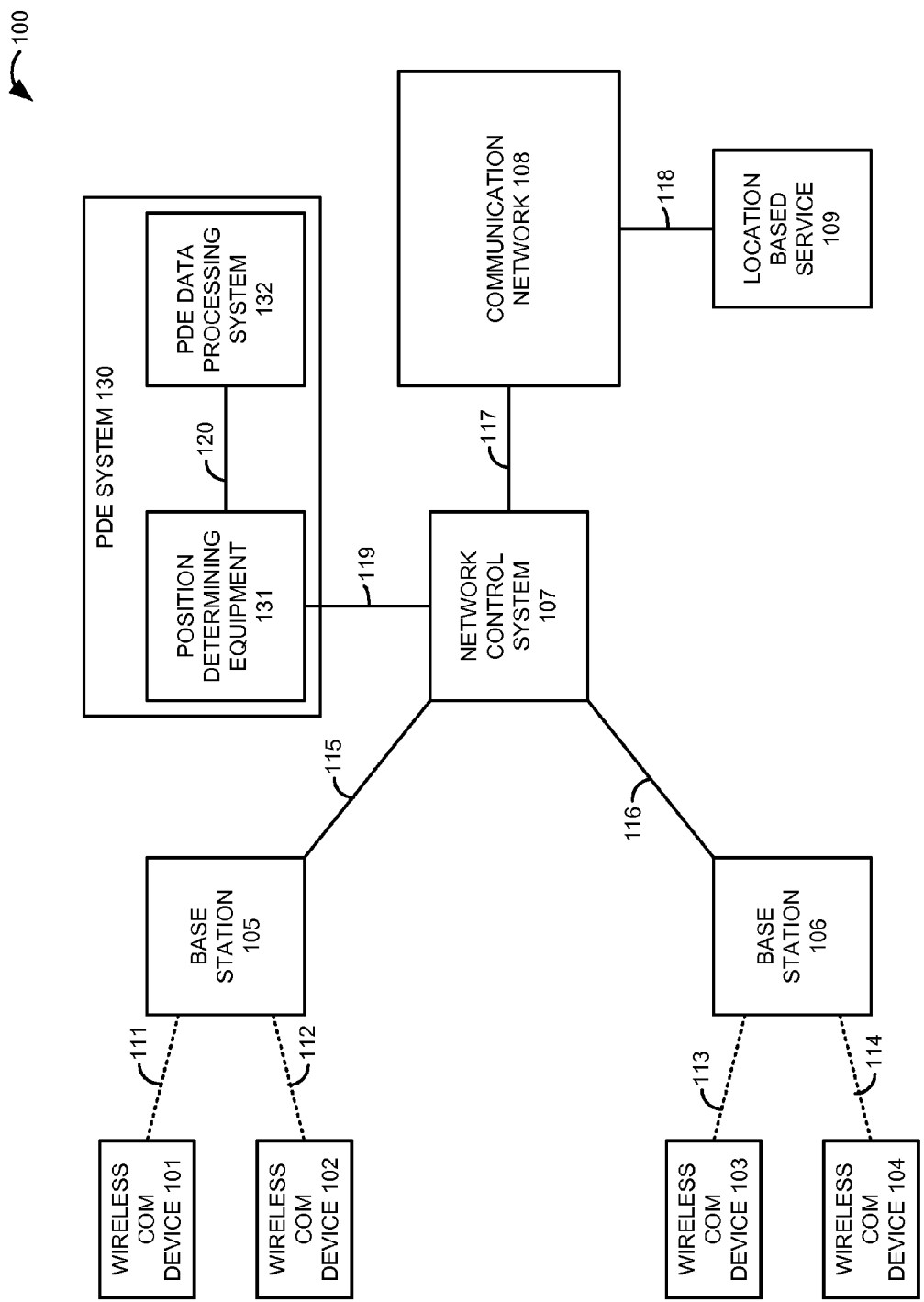
FIG. 1 illustrates a communication system that uses Position Determining Equipment (PDE) to provide location sessions to wireless communication devices and to determine an indicator of average concurrent use of the PDE.

FIG. 1 illustrates communication system 100 that uses Position Determining Equipment (PDE) 131 to provide location sessions to wireless communication devices 101-104 and to determine an indicator of average concurrent use of PDE 131. Communication system 100 comprises: wireless communication devices 101-104, base stations 105-106, network control system 107, communication network 108, location-based service 109, and Position Determining Equipment (PDE) system 130. PDE system 130 includes PDE 131 and PDE data processing system 132. The elements of communication system 100 communicate over communication links 111-120. Note that the number of elements and links in communication system 100 has been restricted for clarity.

Wireless communication devices 101-104 move about to various locations, and location-based service 109 needs to know these locations to provide their service. For example, location-based service 109 may provide driving directions, maps, restaurant recommendations, or some other service to wireless communication devices 101-104. To facilitate the location-based service, each of wireless communication devices 101-104 individually interact with PDE 131 to determine their current geographic location. These individual interactions are referred to as location sessions. PDE data processing system 132 determines an indicator of average concurrent use for PDE 131. The indicator is correlated to the average number of simultaneous location sessions being handled by PDE 131.

To determine the geographic locations of wireless communication devices 101-104, PDE 131 uses different types of position fixes. One type of position fix is the use of Global Position Satellite (GPS) coordinates provided by wireless communication devices 101-104. Another type of position fix is by base station triangulation. Yet another type of position fix is the base station sector occupied by the wireless communication device. Other types of position fixes could be used. There are also hybrid position fixes that combine aspects of the above-described position fix types.

Figure 2:
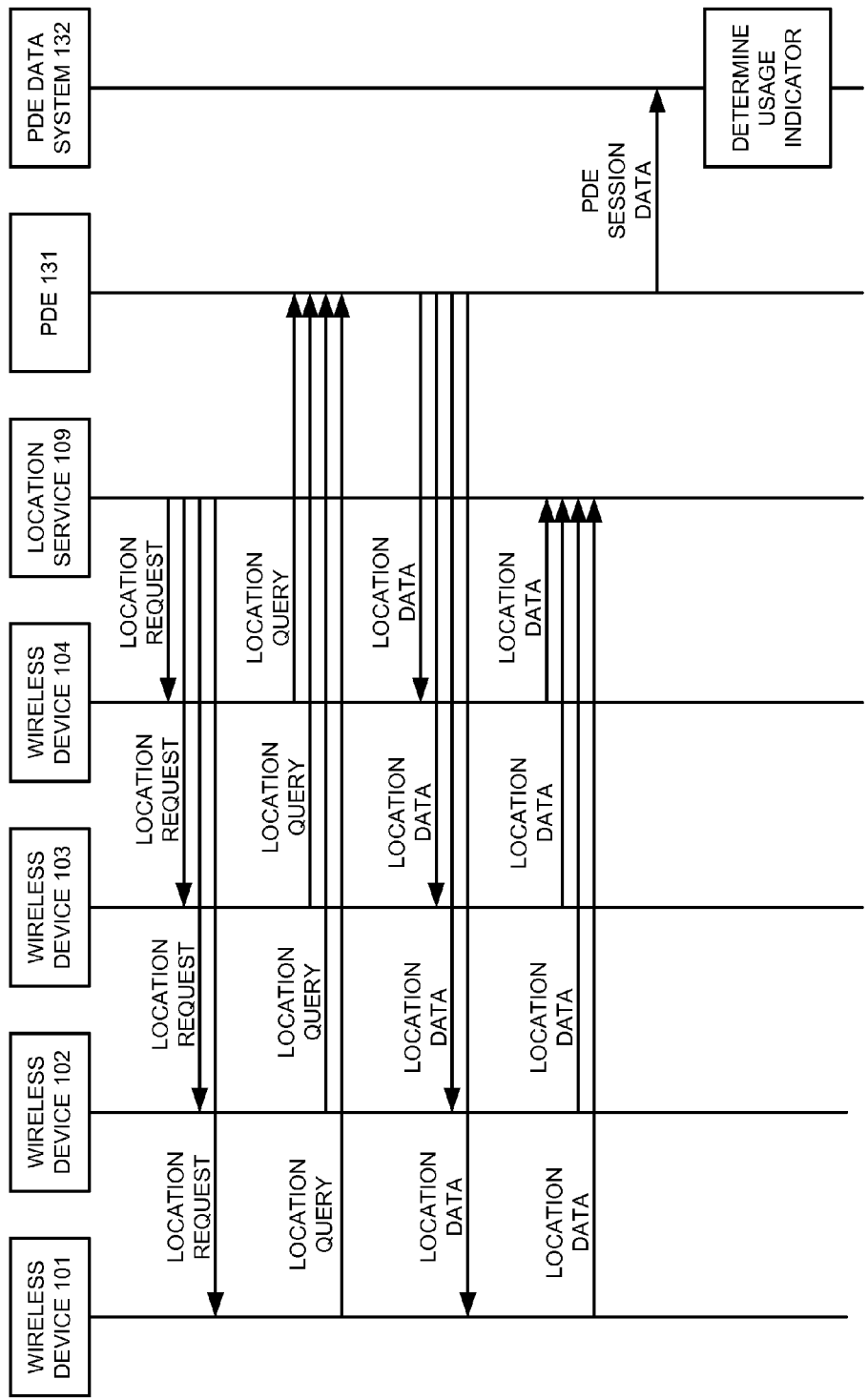
FIG. 2 illustrates the operation of the communication system to provide location sessions and determine an indicator of average concurrent use for the PDE.

FIG. 2 illustrates the operation of communication system 100 to provide location sessions and determine an indicator of average concurrent use for PDE 131. In operation, location based service 109 transfers location requests to wireless communication devices 101-104. In response, wireless communication devices 101-104 transfer location queries to PDE 131. PDE 131 determines the geographic locations of wireless communication devices 101-104 using different types of position fix techniques. PDE 131 transfers corresponding geographic location data to wireless communication devices 101-104.

PDE 131 also transfers location session data to PDE data processing system 132. The location session data indicates cumulative session time for each of the position fix types during a sample period. For example, the sample period could be five minutes and the cumulative session time for GPS position fixes could be 900 seconds, while the cumulative session time for base-station triangulation position fixes could be 700 seconds. The cumulative session time for a specific position fix type represents the total location session time for all wireless communication devices that received location data using that specific position fix type during the sample period.

PDE data processing system 132 determines a usage indicator that correlates to the average concurrent use of PDE 132 during the sample period. To determine the indicator for the sample period, PDE data processing system 132 adds the cumulative session time for each of the different position fix types to determine the total session time for all of the position fix types. PDE data processing system 132 then divides the total session time for all of the position fix types by the total time during the sample period.

Figure 3:
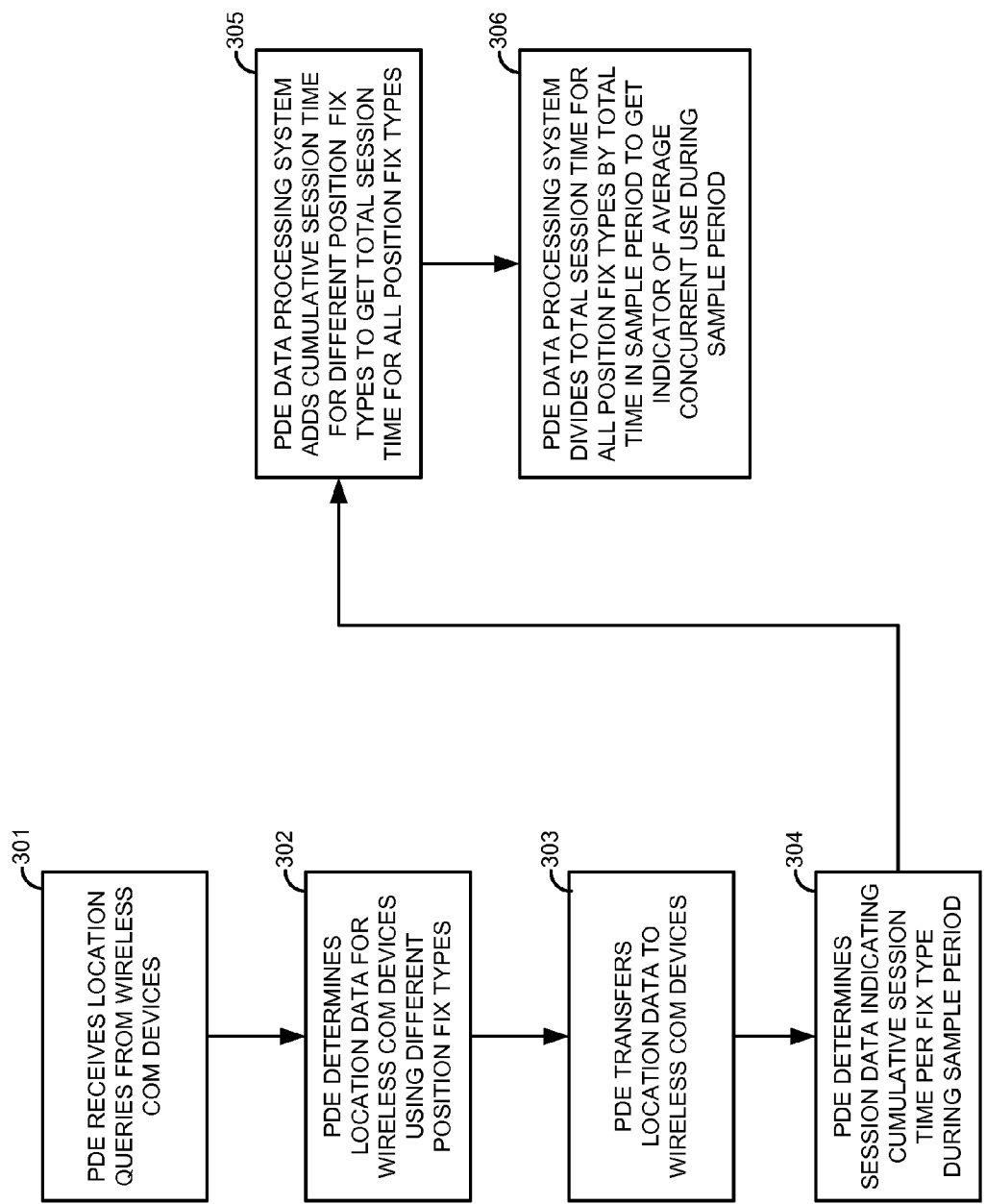
FIG. 3 illustrates the operation of a PDE system to provide location sessions to wireless communication devices and to determine an indicator of average concurrent use of the PDE.

FIG. 3 illustrates the operation of PDE system 130 to provide location sessions to wireless communication devices 101-104 and to determine an indicator of average concurrent use of PDE 131. PDE 131 receives location queries from wireless communication devices 101-104 (301). PDE 131 determines the geographic locations of wireless communication devices 101-104 using different types of position fix types (302). PDE 131 transfers corresponding geographic location data to wireless communication devices 101-104 (303). PDE 131 determines location session data that indicates cumulative session time for each of the position fix types during a sample period (304). PDE data processing system 132 adds the cumulative session time for each of the different position fix types to determine the total session time for all of the position fix types (305). PDE data processing system 132 then divides the total session time for all of the position fix types by the total time during the sample period to get the indicator of average concurrent use of PDE 131 (306).

Figure 4:
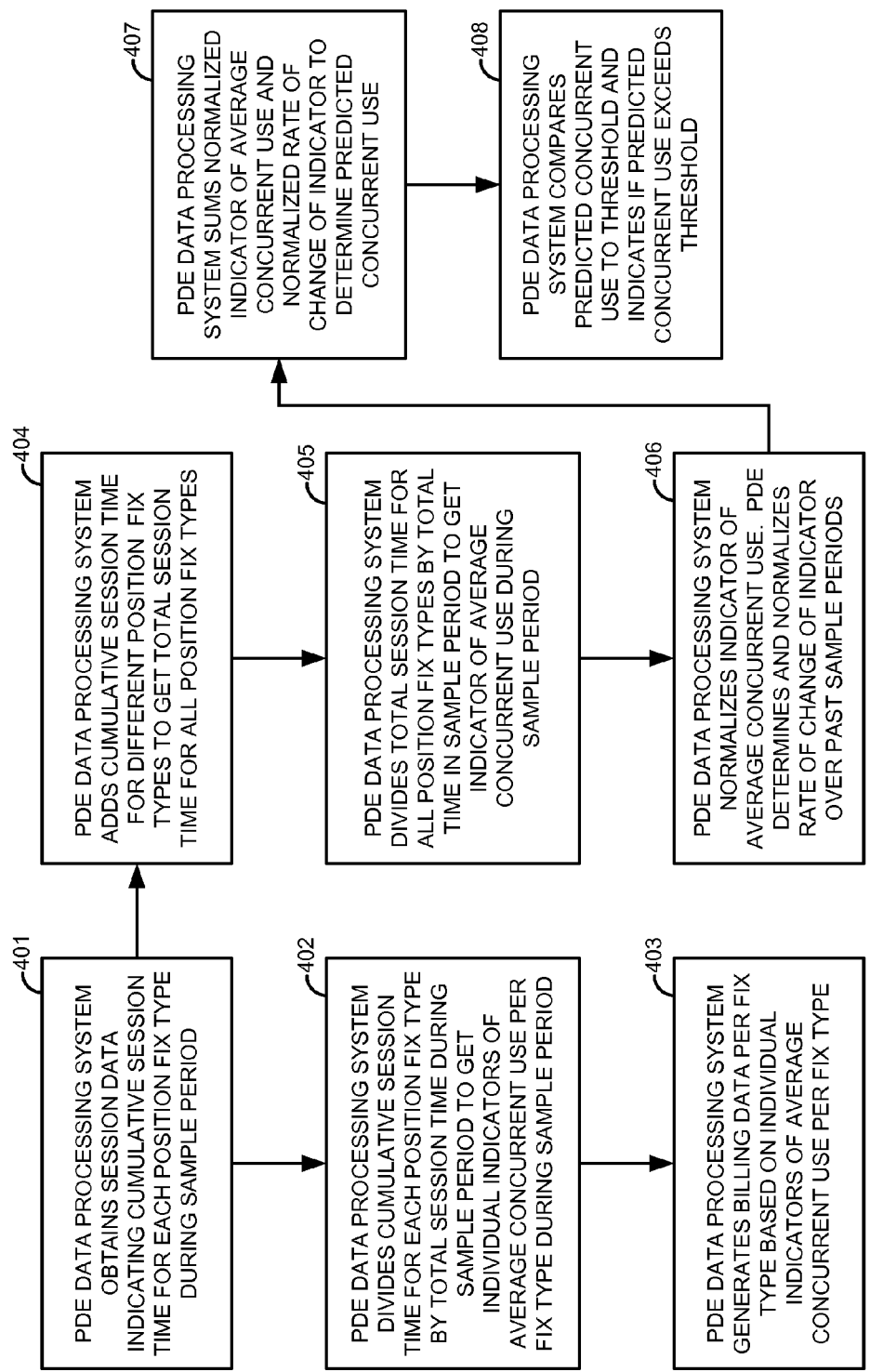
FIG. 4 illustrates the operation of a PDE data processing system to determine individual indicators of average concurrent use of the PDE per position fix type.

FIG. 4 illustrates the operation of PDE data processing system 132 to determine individual indicators of average concurrent use of PDE 131 per position fix type. PDE data processing system 132 obtains location session data that indicates cumulative session time for each of the position fix types during a sample period (401). PDE data processing system 132 divides the cumulative session time for each of the different position fix types by the total time during the sample period to determine individual indicators per fix type of average concurrent use of PDE 131 (402) For example, one individual indicator could represent the average concurrent use of PDE 131 using the GPS position fix type, and another individual indicator could represent the average concurrent use of PDE 131 using the base station triangulation position fix type. PDE data processing system 132 generates billing data per fix type based on the individual indicators per fix type of average concurrent use of PDE 131 (403). For example, PDE system 130 might charge a fee for each sample period equal to:

$10 times the individual indicator for GPS position fixes,
$15 times the individual indicator for base-station triangulation position fixes,
$9 times the individual indicator for hybrid GPS-triangulation position fixes, and
$7 times the individual indicator for sector location position fixes.

PDE data processing system 132 also adds the cumulative session time for each of the different position fix types to determine the total session time for all of the position fix types (404). PDE data processing system 132 then divides the total session time for all of the position fix types by the total time during the sample period to get the indicator of average concurrent use of PDE 131 (405). PDE data processing system 132 normalizes the indicator of average concurrent use of PDE 131 (406). Using the current sample period and at least one past sample period, PDE data processing system 132 determines a rate of change for the indicator of average concurrent use of PDE 131 (406). PDE data processing system 132 normalizes this rate of change. PDE data processing system 132 sums the normalized indicator of average concurrent use of PDE 131 and the normalized rate of change to determine predicted concurrent use of PDE 131 (407). PDE data processing system 132 compares the predicted concurrent use of PDE 131 to a threshold and indicates if the predicted concurrent use exceeds the threshold (408). For example, PDE data processing system 132 might transfer a capacity alarm if the predicted concurrent use of PDE 131 exceeds the threshold.

Figure 5:
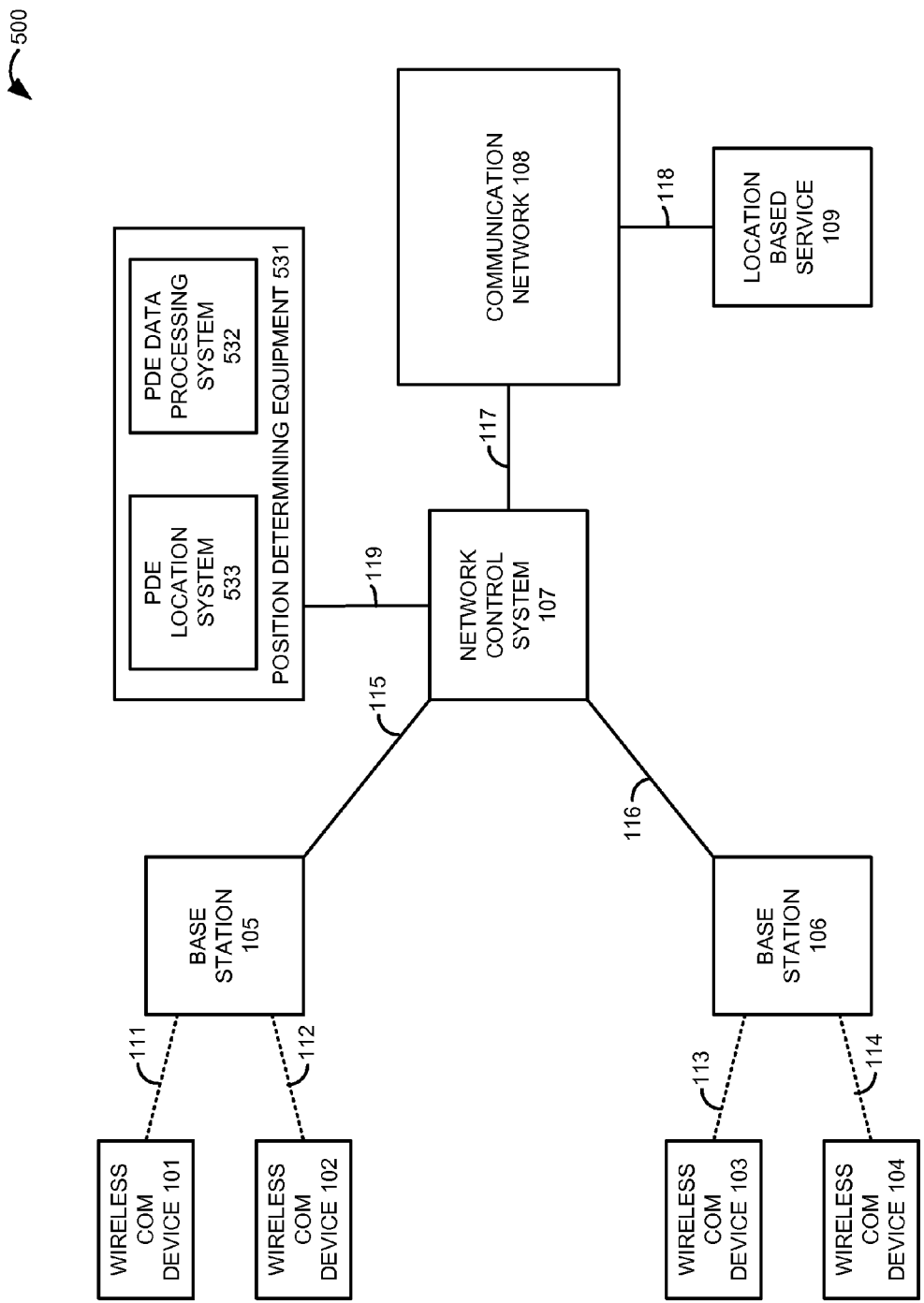
FIG. 5 illustrates a communication system that uses Position Determining Equipment (PDE) to provide location sessions to wireless communication devices and to determine an indicator of average concurrent use of the PDE.

FIG. 5 illustrates communication system 500 that uses PDE 531 to provide location sessions to wireless communication devices 101-104 and to determine an indicator of average concurrent use of PDE 531. Communication system 500 comprises: wireless communication devices 101-104, base stations 105-106, network control system 107, communication network 108, location-based service 109, and PDE 531. The elements of communication system 500 communicate over communication links 111-119. Aside from PDE 531, the elements of communication system 500 are configured and operate as described herein for communication system 100.

PDE 531 includes PDE data processing system 532 and PDE location system 533. PDE system 531 is similar to PDE 131, except that PDE 531 and PDE data processing system 532 are integrated together. PDE data processing system 532 operates as described herein for PDE data processing system 132. PDE location system 533 handles the location sessions and provides location session data as described herein for PDE 131.

Figure 6:
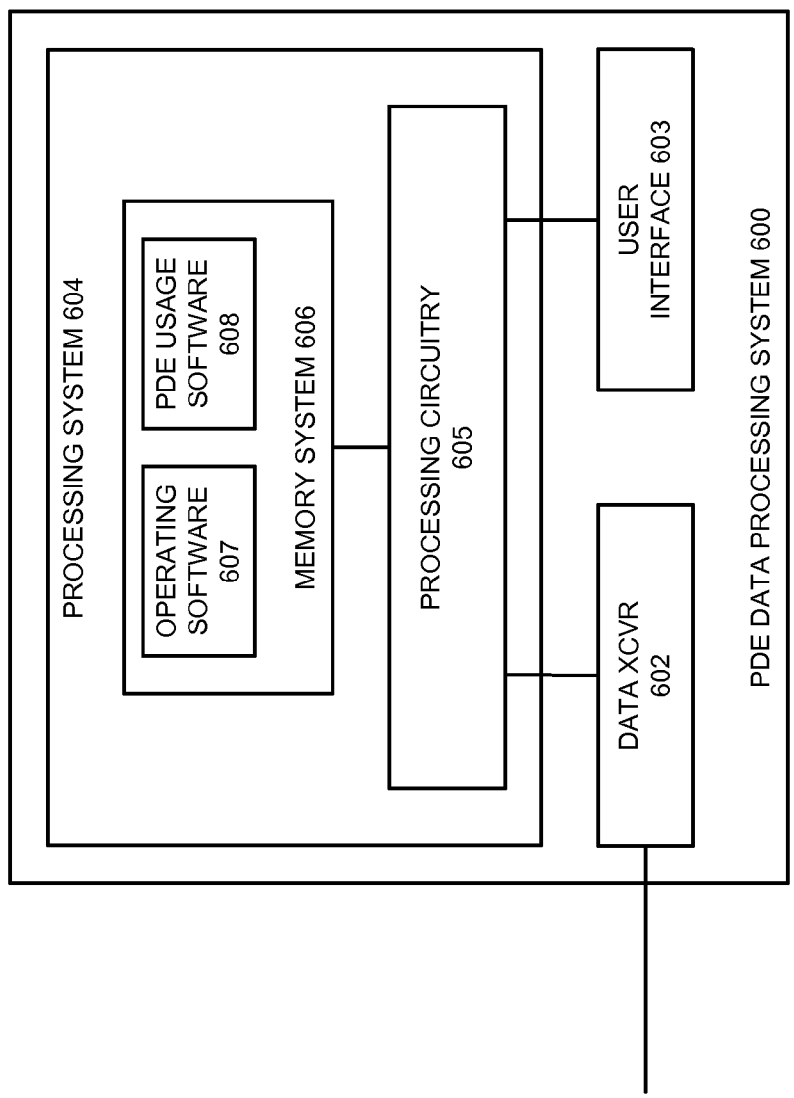
FIG. 6 illustrates a PDE data processing system that determines an indicator of average concurrent use of the PDE.

FIG. 6 illustrates PDE data processing system 600 that determines an indicator of average concurrent use of a PDE. PDE data processing system 600 is an example of PDE data processing systems 132 and 532, although systems 132 and 532 may use alternative configurations. PDE data processing system 600 could be a discrete system or could be integrated into another system. PDE data processing system 600 comprises data transceiver 602, user interface 603, and processing system 604. Processing system 604 comprises processing circuitry 605 and memory system 606 that stores operating software 607 and PDE usage software 608. Processing system 604 is linked to data transceiver 602 and user interface 603. PDE data processing system 600 may include other well-known components that are not shown for clarity, such as enclosures and power systems.

Data transceiver 602 comprises a physical communication port, signal processing circuitry, software, and/or some other communication components. Data transceiver 602 may use various protocols, such as internet protocol, time division multiplex, Ethernet, wireless, or some other data communication format. Data transceiver 602 is equipped to receive location session data and transfer PDE concurrent usage indicators and status information as described herein.

User interface 603 comprises components that interact with a user. These components might include a graphic display, touch-screen, keyboard, buttons, lights, switches, speaker, microphone, or some other user input/output device.

Processing circuitry 605 comprises microprocessor and other circuitry that retrieves and executes operating software 607 and PDE usage software 608 from memory system 606. Memory system 606 comprises a computer-readable storage medium, such as a disk drive, flash drive, data storage circuitry, or some other memory apparatus. Processing circuitry 605 is typically mounted on a circuit board that may also hold at least portions of components 602-604.

Software 607-608 comprises computer programs, firmware, or some other form of computer-readable processing instructions. Operating software 607 may include an operating system, utilities, drivers, network interfaces, applications, or some other type of software. PDE usage software 608 is an application that determines PDE concurrent usage indicators and status information. When executed by processing circuitry 605, software 607-608 directs processing system 604 to process location session data to generate PDE concurrent usage indicators and status information as described herein.

Figure 7:
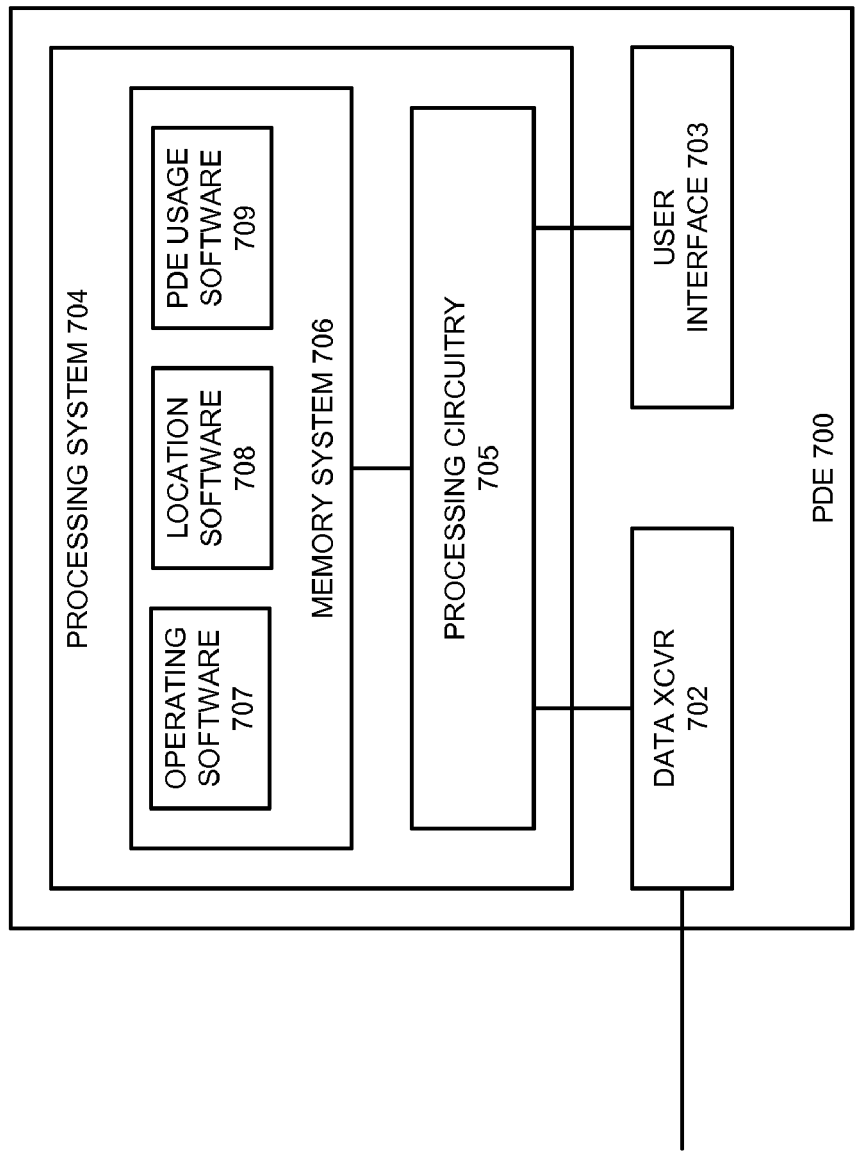
FIG. 7 illustrates a PDE system that provides location sessions to wireless communication devices and that determines an indicator of average concurrent use of the PDE.

FIG. 7 illustrates PDE 700 that provides location sessions to wireless communication devices and that determines an indicator of average concurrent use of PDE 700. PDE 700 is an example of PDE system 130 and PDE 531, although PDE system 130 and PDE 531 may use alternative configurations. PDE 700 could be a discrete system or could be integrated into another system. PDE 700 comprises data transceiver 702, user interface 703, and processing system 704. Processing system 704 comprises processing circuitry 705 and memory system 706 that stores operating software 707, location software 708, and PDE usage software 709. Processing system 704 is linked to data transceiver 702 and user interface 703. PDE 700 may include other well-known components that are not shown for clarity, such as enclosures and power systems.

Data transceiver 702 comprises a physical communication port, signal processing circuitry, software, and/or some other communication components. Data transceiver 702 may use various protocols, such as internet protocol, time division multiplex, Ethernet, wireless, or some other data communication format. Data transceiver 702 is equipped to receive location queries and transfer corresponding location data as described herein. Data transceiver 702 is also equipped to transfer PDE concurrent usage indicators and status information as described herein.

User interface 703 comprises components that interact with a user. These components might include a graphic display, touch-screen, keyboard, buttons, lights, switches, speaker, microphone, or some other user input/output device.

Processing circuitry 705 comprises microprocessor and other circuitry that retrieves and executes operating software 707, location software 708, and PDE usage software 709 from memory system 706. Memory system 706 comprises a computer-readable storage medium, such as a disk drive, flash drive, data storage circuitry, or some other memory apparatus. Processing circuitry 705 is typically mounted on a circuit board that may also hold at least portions of components 702-704.

Software 707-709 comprises computer programs, firmware, or some other form of computer-readable processing instructions. Operating software 707 may include an operating system, utilities, drivers, network interfaces, applications, or some other type of software. Location software 708 is an application that determines the geographic location of wireless communication devices using different types of position fixes as described herein. PDE usage software 709 is an application that determines PDE concurrent usage indicators and status information. When executed by processing circuitry 705, software 707-708 directs processing system 704 to process location queries to provide geographic location data and to process location session data to generate PDE concurrent usage indicators and status information as described herein.

Referring back to FIG. 1, wireless communication devices 101-104 comprise an antenna and RF communication circuitry for wireless communication. The RF communication circuitry typically includes an amplifier, filter, RF modulator, and signal processing circuitry. Wireless communication devices 101-104 also comprise processing circuitry, memory, software, and a user interface. Base stations 105-106 comprise comprises antennas and RF communication circuitry for wireless communication. The RF communication circuitry typically includes an amplifier, filter, RF modulator, and signal processing circuitry. Base stations 105-106 may also comprise other communication equipment and communication links. The equipment may include call processors, routers, servers, switches, memory devices, software, processing circuitry, cabling, power supplies, communication interfaces, and other communication apparatus—including combinations thereof. Network control system 107 comprises a computer and communication system that manages wireless communication sessions between wireless communication devices 101-104 and base stations 105-106, and that provides a communication interface between base stations 105-106, PDE system 130, and communication network 108. Communication network 108 could be an internet protocol network or some other data communication system. Location-based service 109 comprises a computer and communication system that provides a service to wireless communication devices 101-104 based on their geographic locations.

Wireless communication links 111-114 use the air or space as the transport media. Wireless communication links 111-114 may use various protocols, such as Code Division Multiple Access (CDMA), Global System for Mobile Communication (GSM), Evolution Data Only (EVDO), Worldwide Interoperability for Microwave Access (WIMAX), Long Term Evolution (LTE), or some other wireless communication format. Wireless communication links 111-114 could be direct links or may include intermediate networks, systems, or devices.

Communication links 115-120 use metal, glass, air, space, or some other material as the transport media. Communication links 115-120 could use various communication protocols, such as Time Division Multiplex (TDM), Internet Protocol (IP), Ethernet, Code Division Multiple Access (CDMA), Global System for Mobile Communication (GSM), Evolution Data Only (EVDO), Worldwide Interoperability for Microwave Access (WIMAX), Long Term Evolution (LTE), or some other communication format—including combinations thereof. Communication links 115-120 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method of operating a Position Determining Equipment (PDE) system, the method comprising:

in a PDE, receiving location queries for a plurality of wireless communication devices, determining geographic location data for the wireless communication devices using a plurality of different position fix types, and transferring the geographic location data for the wireless communication devices;

in the PDE, determining location session data indicating cumulative session time for each of the different position fix types during a sample period;

in a PDE data processing system, adding the cumulative session time for each of the different position fix types during the sample period to determine a total session time for all of the position fix types during the sample period; and in the PDE data processing system, dividing the total session time for all of the position fix types during the sample period by the total time of the sample period to determine an indicator of average concurrent use of the PDE during the sample period.

2. The method of claim 1 further comprising, in the PDE data processing system, normalizing the indicator of the average concurrent use of the PDE, determining and normalizing a rate of change of the indicator of the average concurrent use of the PDE, summing the normalized rate of change and the normalized indicator of the average concurrent use of the PDE to determine a predicted concurrent usage of the PDE, comparing the predicted concurrent usage of the PDE to a threshold, and indicating if the predicted concurrent usage of the PDE exceeds the threshold.

3. The method of claim 1 further comprising, in the PDE data processing system, dividing the cumulative session time for each of the different position fix types during the sample period by the total time of the sample period to determine individual indicators of average concurrent use of the PDE for each of the different position fix types during the sample period.

4. The method of claim 3 further comprising, in the PDE data processing system, generating per-fix-type billing data based on the individual indicators of average concurrent use of the PDE for each of the different position fix types during the sample period.

5. The method of claim 1 wherein the PDE and the PDE data processing system are integrated together.

6. A method of operating a Position Determining Equipment (PDE) system, the method comprising:
in a PDE data processing system, receiving location session data for a plurality of location sessions performed during a sample period by a PDE using a plurality of different position fix types to provide geographic location data for a plurality of wireless communication devices, wherein the location session data indicates cumulative session time for each of the different position fix types during the sample period;
in the PDE data processing system, adding the cumulative session time for each of the different position fix types during the sample period to determine a total session time for all of the position fix types during the sample period; and
in the PDE data processing system, dividing the total session time for all of the position fix types during the sample period by the total time of the sample period to determine an indicator of average concurrent use of the PDE during the sample period.

7. The method of claim 6 further comprising, in the PDE data processing system, normalizing the indicator of the average concurrent use of the PDE, determining and normalizing a rate of change of the indicator of the average concurrent use of the PDE, summing the normalized rate of change and the normalized indicator of the average concurrent use of the PDE to determine a predicted concurrent usage of the PDE, comparing the predicted concurrent usage of the PDE to a threshold, and indicating if the predicted concurrent usage of the PDE exceeds the threshold.

8. The method of claim 6 further comprising, in the PDE data processing system, dividing the cumulative session time for each of the different position fix types during the sample period by the total time of the sample period to determine individual indicators of average concurrent use of the PDE for each of the different position fix types during the sample period.

9. The method of claim 6 further comprising, in the PDE, determining the session data indicating the cumulative session time for each of the different position fix types during the sample period.

10. The method of claim 6 further comprising, in the PDE, receiving location queries for the wireless communication devices, determining the geographic location data for the wireless communication devices using the different position fix types, and transferring the geographic location data for the wireless communication devices.

11. A Position Determining Equipment (PDE) system comprising:
a PDE configured to receive location queries for a plurality of wireless communication devices, determine geographic location data for the wireless communication devices using a plurality different if position fix types, transfer the geographic location data for the wireless communication devices, and determine location session data indicating cumulative session time for each of the different position fix types during a sample period; and
a PDE data processing system configured to add the cumulative session time for each of the different position fix types during the sample period to determine a total session time for all of the position fix types during the sample period, and divide the total session time for all of the position fix types during the sample period by the total time of the sample period to determine an indicator of average concurrent use of the PDE during the sample period.

12. The PDE system of claim 11 wherein the PDE data processing system is configured to normalize the indicator of the average concurrent use of the PDE, determine and normalize a rate of change of the indicator of the average concurrent use of the PDE, sum the normalized rate of change and the normalized indicator of the average concurrent use of the PDE to determine a predicted concurrent usage of the PDE, compare the predicted concurrent usage of the PDE to a threshold, and indicate if the predicted concurrent usage of the PDE exceeds the threshold.

13. The PDE system of claim 11 wherein the PDE data processing system is configured to divide the cumulative session time for each of the different position fix types during the sample period by the total time deg of the sample period to determine individual indicators of average concurrent use of the PDE for each of the different position fix types during the sample period.

14. The PDE system of claim 13 wherein the PDE data processing system is configured to generate per-fix-type billing data based on the individual indicators of average concurrent use of the PDE for each of the different position fix types during the sample period.

15. The PDE system of claim 11 wherein the PDE and the PDE data processing system are integrated together.

16. A Position Determining Equipment (PDE) system comprising:
a communication transceiver configured to receive session data for a plurality of location sessions performed during a sample period by a PDE using a plurality of different position fix types to provide geographic location data for a plurality of wireless communication devices, wherein the location session data indicates cumulative session time for each of the different position fix types during the sample period; and
a processing system configured to add the cumulative session time for each of the different position fix types during the sample period to determine a total session time for all of the position fix types during the sample period, divide the total session time for all of the position fix types during the sample period by the total time of the sample period to determine an indicator of average concurrent use of the PDE during the sample period.

17. The PDE system of claim 16 wherein:
the processing system is configured to normalize the indicator of the average concurrent use of the PDE, determine and normalize a rate of change of the indicator of the average concurrent use of the PDE, sum the normalized rate of change and the normalized indicator of the average concurrent use of the PDE to determine a predicted concurrent usage of the PDE, compare the predicted concurrent usage of the PDE to a threshold, and initiate a capacity message if the predicted concurrent usage of the PDE exceeds the threshold; and
the communication transceiver is configured to transfer the capacity message.

18. The PDE system of claim 16 wherein the processing system is configured to divide the cumulative session time for each of the different position fix types during the sample period by the total time of the sample period to determine individual indicators of average concurrent use of the PDE for each of the different position fix types during the sample period.

19. The PDE system of claim 16 further comprising:
the PDE configured to determine the session data indicating the cumulative session time for each of the different position fix types during the sample period.

20. The PDE system of claim 16 further comprising:
the PDE configured to receive location queries for the wireless communication devices, determine the geographic location data for the wireless communication devices using the different position fix types, and transfer the geographic location data for the wireless communication devices.

* * * * *